US009712334B2

(12) United States Patent
Jain

(10) Patent No.: US 9,712,334 B2
(45) Date of Patent: Jul. 18, 2017

(54) EFFICIENT MULTICAST TOPOLOGY CONSTRUCTION IN A ROUTED NETWORK

(71) Applicant: BROCADE COMMUNICATIONS SYSTEMS, INC., San Jose, CA (US)

(72) Inventor: Nitin Jain, Saratoga, CA (US)

(73) Assignee: BROCADE COMMUNICATIONS SYSTEMS, INC., San Jose, CA (US)

(\*) Notice: Subject to any disclaimer, the term of this patent is extended or adjusted under 35 U.S.C. 154(b) by 309 days.

(21) Appl. No.: 14/175,942

(22) Filed: Feb. 7, 2014

(65) Prior Publication Data

US 2014/0348022 A1    Nov. 27, 2014

Related U.S. Application Data

(60) Provisional application No. 61/825,958, filed on May 21, 2013.

(51) Int. Cl.
| | | |
|---|---|---|
| H04L 12/18 | (2006.01) | |
| H04L 12/24 | (2006.01) | |
| H04L 12/751 | (2013.01) | |
| H04L 12/761 | (2013.01) | |
| H04L 12/753 | (2013.01) | |

(52) U.S. Cl.
CPC .......... H04L 12/185 (2013.01); H04L 41/12 (2013.01); H04L 45/02 (2013.01); H04L 45/16 (2013.01); H04L 45/48 (2013.01)

(58) Field of Classification Search
CPC ......... H04L 41/12; H04L 45/02; H04L 45/00; H04L 45/04; H04W 84/18

USPC ........................................................ 370/254
See application file for complete search history.

(56) References Cited

U.S. PATENT DOCUMENTS

| | | | | |
|---|---|---|---|---|
| 5,793,975 | A * | 8/1998 | Zeldin | H04L 45/02 709/224 |
| 6,553,028 | B1 * | 4/2003 | Tang et al. | 370/389 |
| 6,707,796 | B1 * | 3/2004 | Li | 370/254 |
| 7,519,010 | B1 * | 4/2009 | Aggarwal | H04L 12/18 370/254 |
| 7,684,316 | B2 * | 3/2010 | Filsfils et al. | 370/222 |
| 8,416,702 | B2 * | 4/2013 | Hoshi | 370/250 |
| 8,644,310 | B2 * | 2/2014 | Fernandez Gutierrez | 370/390 |
| 8,705,403 | B2 * | 4/2014 | Bellagamba et al. | 370/254 |

(Continued)

Primary Examiner — Mark Rinehart
Assistant Examiner — Sanjay K Dewan
(74) Attorney, Agent, or Firm — Shun Yao; Park, Vaughan, Fleming & Dowler LLP

(57) ABSTRACT

One embodiment of the present invention provides a layer-3 forwarding device. The layer-3 forwarding device includes a processor and a computer-readable storage medium. The computer-readable storage medium stores instructions which when executed by the processor cause the processor to perform a method. The method comprises determining whether the layer-3 forwarding device is a leaf layer-3 forwarding device of a multicast distribution tree of a multicast group in a routed network based on a multicast topology discovery message from a root layer-3 forwarding device of the multicast distribution tree. If the layer-3 forwarding device is the leaf layer-3 forwarding device, the method comprises constructing a multicast topology report message. This multicast topology report message includes topology information of the multicast group in the routed network associated with the layer-3 forwarding device.

26 Claims, 13 Drawing Sheets

(56) References Cited

U.S. PATENT DOCUMENTS

| | | | |
|---|---|---|---|
| 2002/0085506 A1* | 7/2002 | Hundscheidt | H04L 12/185 370/254 |
| 2003/0012130 A1* | 1/2003 | Novaes | H04L 12/1854 370/218 |
| 2003/0056006 A1* | 3/2003 | Katsube | H04L 45/00 709/238 |
| 2005/0259595 A1* | 11/2005 | Preguica | H04L 45/16 370/254 |
| 2007/0140245 A1* | 6/2007 | Anjum | H04L 45/04 370/390 |
| 2008/0002690 A1* | 1/2008 | Ver Steeg et al. | 370/390 |
| 2009/0059923 A1* | 3/2009 | Guo | H04L 12/1854 370/390 |
| 2009/0245255 A1* | 10/2009 | Cao | H04L 12/1886 370/390 |
| 2011/0271007 A1* | 11/2011 | Wang | H04L 45/306 709/238 |
| 2012/0188909 A1* | 7/2012 | Previdi | H04L 12/185 370/254 |
| 2013/0089093 A1* | 4/2013 | Bacthu et al. | 370/390 |
| 2014/0153437 A1* | 6/2014 | Tracy | H04L 45/16 370/254 |

\* cited by examiner

US 9,712,334 B2

EFFICIENT MULTICAST TOPOLOGY CONSTRUCTION IN A ROUTED NETWORK

RELATED APPLICATION

This application claims the benefit of U.S. Provisional Application No. 61/825,958, titled "Method and System for Constructing Multicast Topology Within a Routed Network," by inventors Nitin Jain, filed 21 May 2013, the disclosure of which is incorporated by reference herein.

The present disclosure is related to U.S. patent application Ser. No. 13/928,019, titled "Efficient Layer-2 Multicast Topology Construction," by inventors Nitin Jain and Aseem S. Rastogi, filed 26 Jun. 2013, the disclosure of which is incorporated by reference herein.

BACKGROUND

Field

The present disclosure relates to network management. More specifically, the present disclosure relates to a method and system for efficient multicast topology construction in a routed network.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as multicasting, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

One way to meet this challenge is to interconnect a number of switches and routers to support a large number of multicast users. Interconnecting such a large number of switches in a layer-2 network is often not scalable. This issue can be solved by interconnecting switches via layer-3 and creating a routed network. Deploying a routed network requires configurations, such as assigning an address for a respective interface and configuring routing protocols for the switch. As layer-3 (e.g., Internet Protocol or IP) routing technologies continue to evolve, more flexible functionalities, such as a distributed virtualized layer-2 network across layer-3 networks, are being supported.

An efficient multicast topology is usually desirable in a network. A network administrator uses a multicast topology to manage the distribution of data traffic belonging to a corresponding multicast group in the network. A multicast topology in a layer-3 network can span multiple virtual local area networks (VLANs) and layer-3 sub networks (subnets). A routed network typically carries data traffic belonging to multiple multicast groups. A respective multicast group can have a different instance of a multicast topology within the same routed network.

For a specific multicast group, a multicast topology usually corresponds to a multicast distribution tree (can also be referred to as a multicast tree), which provides an active data path between a respective router in the routed network and a root router of the multicast group. The root router is coupled to a source associated with the corresponding multicast group. With existing technologies, obtaining such a data path in a routed network requires device-specific information (e.g., an IP address) of at least one router (usually the terminating router or leaf router) in a path from the root router (e.g., one branch of the corresponding multicast tree). As a result, only one such data path for one multicast group can be obtained at a time. Consequently, constructing a multicast topology for a multicast group can be tedious and repetitious.

While multicast brings many desirable features to a network, some issues remain unsolved in efficient multicast topology construction in a routed network.

SUMMARY

One embodiment of the present invention provides a layer-3 forwarding device. Examples of a layer-3 forwarding device include, but are not limited to, a switch, a router, and a Transparent Interconnection of Lots of Links (TRILL) routing bridge (RBridge). The layer-3 forwarding device includes a processor and a computer-readable storage medium. The computer-readable storage medium stores instructions which when executed by the processor cause the processor to perform a method. The method comprises determining whether the layer-3 forwarding device is a leaf layer-3 forwarding device of a multicast distribution tree of a multicast group in a routed network based on a multicast topology discovery message from a root layer-3 forwarding device of the multicast distribution tree. If the layer-3 forwarding device is the leaf layer-3 forwarding device, the method comprises constructing a multicast topology report message. This multicast topology report message includes topology information of the multicast group in the routed network associated with the layer-3 forwarding device.

In a variation on this embodiment, if the layer-3 forwarding device is a leaf layer-3 forwarding device, the method further comprises including additional information in the multicast topology report message. This additional information corresponds to device and link information associated with the layer-3 forwarding device. In a variation on this embodiment, the destination address of the report message corresponds to a multicast address of the multicast group.

In a variation on this embodiment, the destination address of the report message corresponds to a multicast address of the multicast group.

In a variation on this embodiment, if the layer-3 forwarding device is not a leaf layer-3 forwarding device, the method comprises extracting topology information of the multicast group from a first multicast topology report message.

In a further variation, the method further comprises including topology information of the multicast group in the routed network associated with the layer-3 forwarding device in the first multicast topology report message.

In a further variation, the method further comprises extracting topology information of the multicast group in the routed network from a second multicast topology report message. The topology information extracted from the first and second multicast topology report messages corresponds to a plurality of downstream layer-3 forwarding devices in the multicast distribution tree with respect to the layer-3 forwarding device.

In a further variation, the method further comprises summarizing the extracted topology information corresponding to the plurality of downstream layer-3 forwarding devices and including the summarized information in a third multicast topology report message. The method also comprises including topology information of the multicast group associated with the layer-3 forwarding device in the third multicast topology report message.

In a further variation, the method further comprises precluding the layer-3 forwarding device from associating a local port with the third multicast topology report message as an output port. The local port corresponds to a downstream layer-3 forwarding device of the multicast distribution tree.

In a variation on this embodiment, the multicast topology discovery message also includes a time to leave (TTL) value. This TTL value indicates number of hops multicast topology discovery message is allowed to travel in a routed network.

In a further variation, if the TTL value is expired, the method further comprises constructing the multicast topology report message.

In a variation on this embodiment, the multicast topology report message also includes topology information of the multicast group in a layer-2 network associated with the layer-3 forwarding device.

One embodiment of the present invention provides a computing system. The computing system includes a processor and a computer-readable storage medium. The computer-readable storage medium stores instructions which when executed by the processor cause the processor to perform a method. The method comprises generating an instruction for constructing a multicast topology for a multicast group in a routed network. This instruction includes an identifier of the multicast group and an identifier of a source of the multicast group. The method further comprises incorporating the instruction in a message. The destination address of the message corresponds to a root layer-3 forwarding device of the multicast group. This root layer-3 forwarding device is coupled to the source via one or more links.

In a variation on this embodiment, the instruction is in a type-length-value (TLV) format.

In a variation on this embodiment, the message is encapsulated in a format recognizable by the root layer-3 forwarding device.

In a variation on this embodiment, the instruction also includes a TTL value. This TTL value indicates number of hops a multicast topology discovery message is allowed to travel in a routed network.

BRIEF DESCRIPTION OF THE FIGURES

In the figures, like reference numerals refer to the same figure elements.

DETAILED DESCRIPTION

Figure 1A:
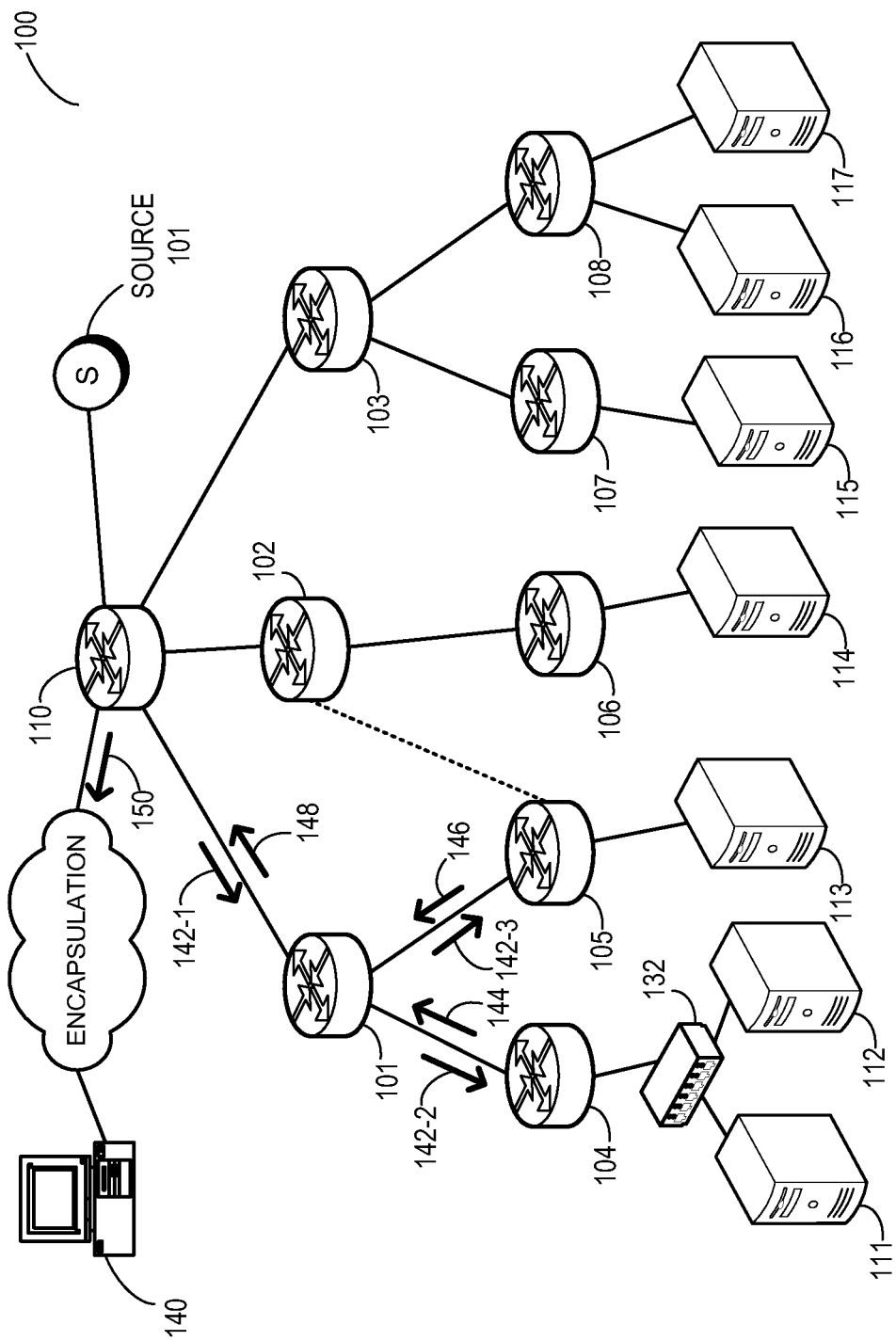
FIG. 1A illustrates an exemplary multicast topology construction in a routed network, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently obtaining a multicast topology in a routed network is solved by a respective router in the routed network disseminating multicast topology information to a root router of a multicast group. A root router is typically the router to which a source for the multicast group is coupled via one or more wired and/or wireless links. In the routed network, for a specific multicast group, the multicast topology represents an active (i.e., not via any blocked port) data path between a respective router in the network and the root router of the multicast group. Examples of a routed network include, but are not limited to, an Internet Protocol (IP) network (e.g., IP version 4 and IP version 6) and a Transparent Interconnection of Lots of Links (TRILL) network.

With existing technologies, obtaining a respective data path in a multicast topology, which usually corresponds to a multicast distribution tree (can also be referred to as a multicast tree), represented by requires router-specific information of the root router and at least one other router in the path. Usually this other router is a leaf router, which is the terminating router of the path and coupled to the receivers of multicast data. By sending a query to the leaf router, only that specific data path from the root router to the leaf router (i.e., a branch of the corresponding multicast tree) can be obtained. Consequently, constructing a multicast topology, which corresponds to the complete multicast tree comprising all leaf routers, for a multicast group requires repeated construction of data paths for a respective leaf router of the multicast group.

If router-specific information of a leaf switch is not known, the constructed topology may not represent the data path toward that leaf router and the multicast topology can have an inaccurate representation of the multicast tree. Moreover, because this process is specific to the data path construction, the process does not collect additional information to validate the multicast states in the paths. As a result, constructing a multicast topology in a routed network can be tedious, repetitious, error-prone, and often incomplete.

To solve this problem, the root router of the multicast group obtains the multicast topology in the routed network by sending a multicast topology discovery message to a respective router via its multicast tree of the multicast group. Note that the multicast tree can be further associated with a source of the multicast group. In other words, the multicast tree can be a shared multicast tree or a source-specific multicast tree. Because the root router uses the multicast tree, router-specific information for a respective leaf router is not needed. A respective router, which is associated with the multicast group and coupled to the root router, receives this discovery message from the root router and forwards the discovery message further downstream until a leaf router is reached. The leaf router constructs a multicast topology report message, which comprises multicast topology information associated with the router, and forwards the report message to the active upstream router (i.e., the upstream router from which it receives multicast data packets).

The upstream router processes the message, adds its own multicast information to the message, and forwards the message further upstream. In this way, the report message is processed at a respective routed hop (e.g., at a respective IP router) from a respective leaf router in the multicast tree to the root router. As a result, a single discovery message from the root router can obtain the multicast topology of a respective multicast group. Because the discovery and report messages traverse the multicast tree, the multicast topology represents the multicast tree accurately. Furthermore, if needed, the report message can include additional information, such as multicast state validation information, link information, multicast resource information (e.g., hardware and/or software forwarding indices), etc.

In some embodiments, a router can be a fabric switch. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch (or router) to all other devices in the network. Operation of a fabric switch is specified in U.S. patent application Ser. No. 13/087,239, titled "Virtual Cluster Switching," by inventors Suresh Vobbilisetty and Dilip Chatwani, filed 14 Apr. 2011, the disclosure of which is incorporated herein in its entirety.

Although the present disclosure is presented using examples based on IP networks, embodiments of the present invention are not limited to IP networks. Embodiments of the present invention are relevant to any networking protocol which facilitates routing between two networking devices. In this disclosure, the term "routed network" is used in a generic sense, and can refer to any networking layer, sub-layer, or a combination of networking layers.

In this disclosure, the term "end device" can refer to a host machine, a conventional layer-2 switch, or any other type of network device. Additionally, an end device can be coupled to other switches or hosts further away from a routed network. An end device can also be an aggregation point for a number of network devices to enter the routed network.

The term "message" refers to a group of bits that can be transported together across a network. "Message" should not be interpreted as limiting embodiments of the present invention to a particular network layer. "Message" can be replaced by other terminologies referring to a group of bits, such as "packet," "frame," "cell," or "datagram."

The term "router" is used in a generic sense, and can refer to any standalone switch or switching fabric operating in any network layer. "Router" should not be interpreted as limiting embodiments of the present invention to IP networks. Any physical or virtual device (a virtual switch running on a computing device) that can route traffic in a network can be referred to as a "router." Furthermore, a "router" can also refer to any "layer-3 forwarding device" with layer-3 forwarding capability. The terms "router" and "layer-3 forwarding device" are used interchangeably. Examples of a "router" include, but are not limited to, a layer-2 switch, a layer-3 router, a TRILL RBridge, and a physical or virtual machine with routing capability, such as a laptop or desktop computer, a tablet, and a cellular phone.

The term "multicast topology" is used in a generic sense, and can refer to any topology associated with any "multicast protocol." A "multicast topology" represents a respective data path to a respective leaf networking device in a multicast tree of the multicast group. A "multicast protocol" can refer to any protocol that can be used by devices in a network to distribute multicast data and/or control information. Examples of multicast protocol include, but are not limited to, Internet Group Management Protocol (IGMP), Multicast Listener Discovery (MLD) protocol, and Protocol-Independent Multicast (PIM). The term "multicast distribution tree" is also used in a generic sense, and can refer to any tree topology that can be used to distribute multicast data and/or control information in a network. The terms "multicast distribution tree" and "multicast tree" are used interchangeably in this disclosure.

Network Architecture

FIG. 1A illustrates an exemplary multicast topology construction in a routed network, in accordance with an embodiment of the present invention. As illustrated in FIG. 1, a routed network 100 includes routers 101, 102, 103, 104, 105, 106, 107, and 108. Examples of network 100 include, but are not limited to, an IP network and a TRILL network. In some embodiments, one or more routers in network 100 can be in a fabric switch and can appear as a single logical router to all other routers in network 100. Between two routers, there can be one or more wired/wireless links spanning one or more lower-layer networks (i.e., lower than IP layer, such as Ethernet and TRILL). A number of end devices 111, 112, 113, 114, 115, 116, and 117 are coupled to routers 104, 105, 106, 107, and 108. Router 110 is coupled to routers 101, 102, and 103. A source 101, which can be an end device, for a multicast group is coupled to router 110 via one or more wired and/or wireless links.

During operation, router 110 distributes periodic membership queries for the multicast group through network 100. In some embodiments, router 110 generates the membership queries. One or more of the end devices 111-117 can join the multicast group by sending a join request in response to the membership query. In some embodiments, IGMP and/or MLD can be used for the membership queries and corresponding join requests. For example, end device 111 can send an IGMP join request to router 104 via a layer-2 switch 132. Upon receiving the request, router 104 can use PIM to be a multicast router, which is a router that receives multicast traffic for the multicast group. In the same way, end devices 112 and 113 in network 100 can become receivers of multicast data traffic from source 101, and router 105 can become a multicast router.

Router 110 directs data traffic from source 101 toward the receivers via the routers in network 100, thereby forming a multicast tree rooted at router 110 for the multicast group. As a result, routers 104 and 105, as well as intermediate router 101 join the corresponding multicast tree. Router 110 operates as the root for the multicast tree because router 110 is coupled to source 101 and first receives multicast data traffic from source 101 in network 100. In the multicast tree, router 104 and 105 are referred to as leaf routers because these routers do not have any other downstream routers in the multicast tree.

Because end devices 111, 112, and 113 have joined the multicast group, the corresponding multicast topology represents a forwarding data path from router 110 to router 104, which is coupled to end devices 111 and 112, and to router 105, which is coupled to end device 113. With existing technologies, such as Multicast Traceroute (Mtrace), obtaining such a data path in layer-3 requires router-specific information, such as an identifier (e.g., an IP address) for root router 110, and leaf routers 104 and 105. To obtain the path to router 104 in network 100, an administrator device 140, which can be an end device, sends an instruction to root router 110 based on the identifiers of routers 110 and router 104. In some embodiments, administrator device 140 resides in a different subnet than router 110 and can use encapsulation (e.g., a tunnel encapsulation) to communicate with router 110. This encapsulation is in a format recognizable by router 110 and administrator device 140. Based on the received instruction, router 110 instructs router 104 to inform router 110 regarding the path.

Consequently, router 104 sends a message to router 110, which obtains the path information from router 110 to router 104 by traversing the path, hop-by-hop, in reverse direction. Upon receiving the message, router 110 sends the path information back to administrator device 140. In the same way, administrator device 140 can obtain the path information from router 110 to router 105 by issuing another instruction based on the identifiers of routers 110 and 105. As a result, constructing the multicast topology requires repeated construction of data paths from router 110 to routers 104 and 105. Furthermore, if administrator device 140 is not aware of one of the routers, such as router 105, the constructed multicast topology does not include the path to router 105 and becomes incomplete. Mtrace is described in IETF draft "Mtrace Version 2: Traceroute Facility for IP Multicast," available at http://tools.ietf.org/html/draft-ietf-mboned-mtrace-v2-08, which is incorporated by reference herein.

To solve this problem, when root router 110 receives an instruction for constructing a multicast topology in routed network 100 for the multicast group, router 110 identifies the downstream routers in the corresponding multicast tree and sends a multicast topology discovery message via the multicast tree. In some embodiments, a network administrator provides the instruction to router 110. The network administrator can also provide the instruction to administrator device 140, which, in turn, sends a notification message comprising the instruction to router 110. This notification message can be encapsulated in a tunnel encapsulation. In this example, router 110 is coupled to router 101 in the multicast distribution tree and sends discovery message 142-1 to router 101. In some embodiments, router 110 simply sends discovery message 142-1 to all downstream routers coupled to router 110 (i.e., routers 101, 102, and 103). Upon receiving discovery message 142-1, a respective router can either forward discovery message 142-1 to all other routers, or can selectively forward discovery message 142-1 to the downstream routers associated with the multicast group.

Upon receiving discovery message 142-1, router 101 identifies downstream routers 104 and 105 in the multicast tree and the local ports of router 101 associated with routers 104 and 105. Router 101 then forwards discovery messages 142-2 and 142-3 to routers 104 and 105, respectively. Note that discovery messages 142-1, 142-2, and 142-3 are copies of the same discovery message and can generally be referred to as discovery message 142. In some embodiments, discovery message 142 can be in a PIM control message or an Mtrace discovery message format. Upon receiving discovery message 142-2, router 104 detects that router 104 is coupled to no other downstream router in the multicast tree and, hence, identifies itself as a leaf router. In some embodiments, when router 104 becomes active (e.g., is switched on), router 104 determines whether router 104 is a leaf switch or not for the multicast group, and detects router 101 as the upstream router. In some other embodiments, router 104 can be configured as a leaf switch (e.g., by a network administrator). Upon receiving discovery message 142-2, router 104 constructs a multicast topology report message 144 and includes multicast topology information in report message 144.

Examples of multicast topology information include, but are not limited to, one or more identifiers of router 104 (e.g., a media access control (MAC) and/or an IP address), an indicator of membership in a multicast group, a port identifier which identifies the upstream port associated with upstream router 101, a list of downstream ports associated with the multicast group (e.g., ports coupling switch 132), and information regarding any layer-3 router, which may not be part of the multicast tree, coupled to router 104. In addition, router 104 can include additional information, such as multicast validation information, link capacity and/or utilization of the links between routers 101 and 104, VLAN information, encapsulation (e.g., tunneling) information, and multicast resource information (e.g., hardware and/or software forwarding indices in router 104). Note that links between routers 101 and 104 can be part of one or more layer-2 networks (i.e., routers 101 and 104 can have one or more layer-2 networks between them).

Similarly, upon receiving discovery message 142-3, router 105 identifies itself as a leaf router and constructs a multicast topology report message 146 and includes multicast topology information in report message 146. Routers 104 and 105 send report messages 144 and 146, respectively, to the multicast address of the multicast group (e.g., the multicast IP address of the multicast group). Router 101 is the upstream router (i.e., the router from which routers 104 and 105 have received discovery messages 142-2 and 142-3, respectively), of routers 104 and 105 in the multicast distribution tree. Hence, report messages 144 and 146, with the multicast address as the destination address, reach router 101 from routers 104 and 105, respectively. Because router 101 is a multicast router of the multicast group, router 101 can process report messages 144 and 146 even though these messages are not specifically addressed to router 101.

Upon receiving report messages 144 and 146, router 101 processes the messages and identifies these messages as multicast topology report messages. Based on this identification, even though these messages are addressed to the multicast group, router 101 does not forward the messages to downstream routers. For example, based on this identification, router 101 does not forward report message 144 to router 105 even though report message 144's destination address is the address of the multicast group. In some embodiments, router 101 extracts the contents, such as the multicast information associated with routers 104 and 105, from report messages 144 and 146, respectively, and summarizes the extracted information. Router 101 then creates a multicast topology report message 148, includes the summarized information in the report message, and adds local multicast and additional information to report message 148. Router 101 sends report message 148 to the multicast address of the multicast group.

Routers 104 and 105 can send report messages 144 and 146 at different times. In some embodiments, after receiving a report message from one router, router 101 can wait for a certain period of time (can be referred to as a "waiting period") for the arrival of another report message from another router. For example, after receiving report message 144 from router 104, router 101 can wait for a report message from router 105. In this way, router 101 can receive report messages from all downstream routers and summarize their contents. Allowing router 101 to wait for report messages from all downstream routers can lead to efficient message exchange via the multicast tree. In some embodiments, router 101 only summarizes the report messages received within the waiting period. Any report message received after this period can trigger another waiting period and is processed separately.

Root router 110 receives report message 148 from router 101, extracts information from report message 148, and constructs the multicast topology for the multicast group based on the extracted information. In this way, one single instruction can construct the multicast topology for the multicast group without requiring repetitive messaging. Because the discovery and report messages (e.g., messages 142, 144, 146, and 148) traverse the multicast distribution tree, the constructed multicast topology accurately represents the paths to all leaf routers in the multicast tree. Furthermore, router 110 can also receive additional information, such as multicast state validation information, and link capacity and utilization information. Hence, router 110 can construct an accurate multicast topology with additional information in routed network 100 using a single command.

In some embodiments, root router 110 stores the multicast topology information in a data structure indexed by the source address and the group address. Other indexing keys can include a VLAN tag and Virtual Routing and Forwarding (VRF) identifier. This data structure can be arranged by hop-distance (i.e., based on the number of hops from root router 110). For example, the data structure can arrange information regarding routers 101 and 104 based on the hop distance from root router 110. Such an arrangement allows root router 110 to reconstruct the topology efficiently. The routers with the same hop distance can be linked together. For example, routers 104 and 105 can be linked together in the data structure.

In some embodiments, root router 110 creates a notification message 150, which includes the multicast topology information stored in the data structure. Root router 110 then forwards that notification message to administrator device 140. This message 150 can be in a format recognizable by administrator device 140. Root router 110 can summarize the multicast topology information of the multicast group from the data structure in message 150. In some embodiments, root router 110 can encapsulate message 150 and forward the encapsulated message to administrator device 140. This encapsulation format should be recognizable by router 110 and administrator device 140.

In some embodiments, a router in network 100 can have more than multiple equal-cost paths to the same root router. For example, router 105 can also have another equal-cost path to root router 110 via router 102 (denoted with dotted lines). Such equal cost paths can be used for load sharing different multicast streams over multiple paths and improve bandwidth utilization and congestion avoidance. If a router has more than one upstream paths with same cost (e.g., router 105 has two paths via routers 101 and 102 toward root router 110), the router can include additional information in the report message indicating that there is more than one upstream path with the same cost. Multipath issues in multicast next-hop selection is discussed in IETF Request for Comments (RFC) 2991, titled "Multipath Issues in Unicast and Multicast Next-Hop Selection," available at http://http://tools.ietf.org/html/rfc2991, which is incorporated by reference herein.

In some embodiments, root router 110 maintains a timer indicating a period of time for which root router 110 waits for a report message corresponding to discovery message 142-1. This period of time can be referred to as a wait time for discovery message 142-1. Root router 110 can include this wait time in discovery message 142-1. Root router 110 can also include a sequence number in discovery message 142-1, which uniquely identifies discovery message 142-1 for the multicast group (and corresponding source 101). If root router 110 receives report message 148 within the wait time, root router 110 processes report message 148 to construct the multicast topology. Otherwise, root router 110 generates another discovery message, which includes a different sequence number. Report messages 144, 146, and 148 can include the sequence number of discovery message 142-1 and indicate that these messages correspond to discovery message 142-1.

When an intermediate router receives the discovery message, the router can include a timestamp in the message, so that the downstream routers can determine how much time is left of the wait time. For example, upon receiving discovery message 142-1, router 101 can include its current timestamp in discovery message 142-2. As a result, when router 104 receives discovery message 142-2, router 104 can determine how much time left of the wait time.

An intermediate router may support multicast topology discovery. As a result, the intermediate router may not recognize a discovery or report message. In some embodiments, the discovery or report message is in a format such that even when a router does not the message, the router continues to forward the message to the other routers of the multicast tree. This allows other routers with multicast topology construction support to construct the multicast topology. In this way, a network can include routers that do not have this multicast topology construction support and still provide the multicast topology to the root router.

Figure 1B:
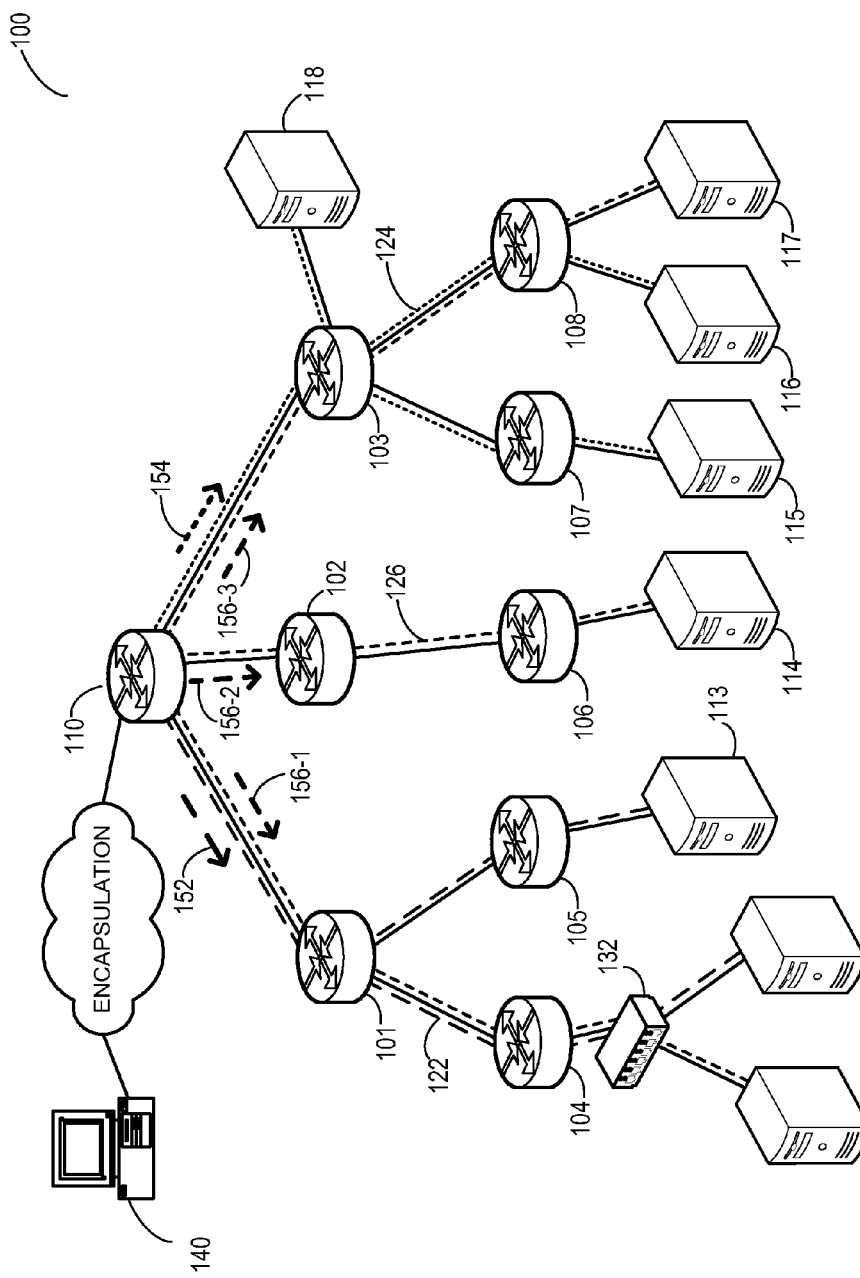
FIG. 1B illustrates exemplary multicast topology construction in a routed network for a plurality of multicast groups, in accordance with an embodiment of the present invention.

FIG. 1B illustrates exemplary multicast topology construction in a routed network for a plurality of multicast groups, in accordance with an embodiment of the present invention. In this example, router 110 operates as the root router for multicast groups 122, 124, and 126. During operation, end devices 112 and 113 join multicast group 122; end devices 115, 116, and 118 join multicast group 124; and end devices 111, 114, and 117 join multicast group 126. The multicast tree for multicast group 122 includes routers 101, 104, and 105. In some embodiments, administrator device 140 sends a notification message comprising an instruction to router 110 to obtain the multicast topology for multicast group 122. To obtain multicast topology for multicast group 122, router 110 sends a multicast topology discovery message 152 to router 101, which further forwards discovery message 152 to routers 104 and 105. Upon receiving discovery message 152, leaf routers 104 and 105 send report messages using the multicast address of multicast group 122. Consequently, the report messages travel toward root router 110 via the corresponding multicast tree, thereby allowing root router 110 to construct the topology for multicast group 122, as described in conjunction with FIG. 1A.

Similarly, the multicast tree for multicast group 124 includes routers 103, 107, and 108. To obtain multicast topology for multicast group 124, router 110 sends a multicast topology discovery message 154 to router 103. Router 103 has a locally coupled end device 118, which has joined multicast group 124. However, because router 103 is coupled to two downstream routers 107 and 108, router 103 does not consider itself a leaf router and forwards discovery message 154 to routers 107 and 108. Leaf routers 107 and 108 send report messages using the multicast address of multicast group 124. Consequently, the report messages travel toward root router 110 via the corresponding multicast tree, thereby allowing root router 110 to construct the topology for multicast group 124, as described in conjunction with FIG. 1A.

The multicast tree for multicast group 126 includes routers 101, 102, 103, 104, 106, and 108. To obtain multicast topology for multicast group 126, router 110 sends a multicast topology discovery message 156-1 to router 101, discovery message 156-2 to router 102, and discovery message 156-3 to router 103. Discovery messages 156-1, 156-2, and 156-3 are copies of the same discovery message and can generally be referred to as discovery message 156. Router 101 detects that downstream router 104 is in the multicast tree for multicast group 126 while downstream router 105 is not. Hence, router 101 forwards discovery message 156-1 to router 104 and not to router 105. Similarly, router 102 forwards discovery message 156-2 to router 106, and router 103 forwards discovery message 156-3 to router 108. Leaf routers 104, 106, and 108 send report messages using the multicast address of multicast group 126. Consequently, the report messages travel toward root router 110 via the corresponding multicast tree, thereby allowing root router 110 to construct the topology for multicast group 126, as described in conjunction with FIG. 1A.

Multicast Topology Discovery Message

Figure 2A:
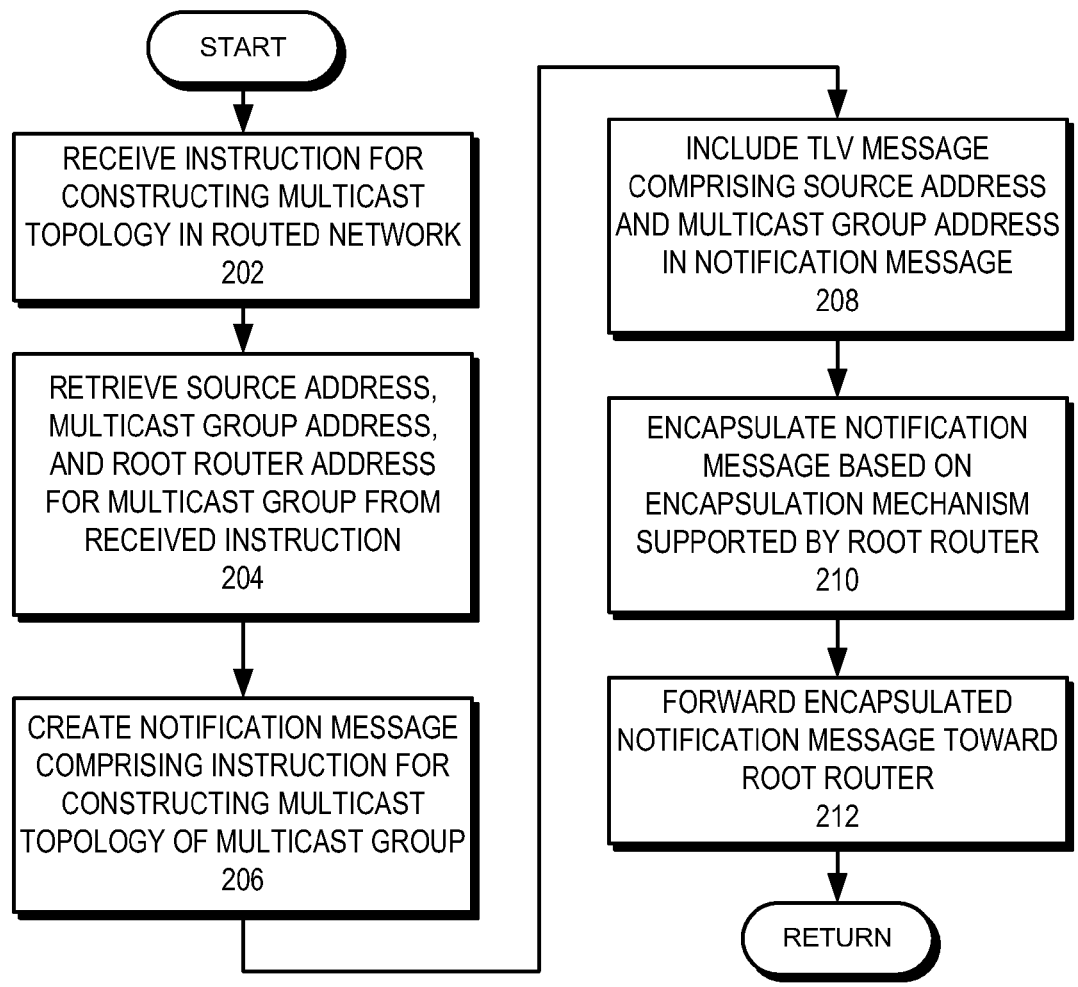
FIG. 2A presents a flowchart illustrating the process of an administrator device instructing a root router to construct a multicast topology in a routed network, in accordance with an embodiment of the present invention.

In the example in FIG. 1B, root router 110 can receive instructions from administrator device 140, which can be an end device, to construct multicast topologies for multicast groups 122, 124, and 126. In response, router 110 sends discovery messages 152, 154, and 156 to obtain the corresponding multicast topologies. FIG. 2A presents a flowchart illustrating the process of an administrator device instructing a root router to construct a multicast topology in a routed network, in accordance with an embodiment of the present invention. Upon receiving an instruction for constructing a multicast topology (e.g., from a network administrator) for a multicast group in a routed network (operation 202), the administrator device retrieves the source address, multicast group address, and root switch address for the multicast group from the received instruction (operation 204). In some embodiments, the administrator device receives the instruction from a network administrator via a command line interface, a network management tool, a web interface, or any other type of interaction mechanism associated with the administrator device.

The administrator device then creates a notification message comprising instruction for constructing the multicast topology of the multicast group (operation 206). The administrator device includes a type-length-value (TLV) message comprising the source address and multicast group address in the notification message (operation 208). The administrator device can also include a time to leave (TTL) value, which indicates the number of hops a discovery message travels. For example, if the TTL value expires at a router, that router, even if it is not a leaf router, sends back the report message.

In some embodiments, the administrator device encapsulates the notification message based on an encapsulation mechanism supported by the root router (operation 210) and forwards the encapsulated notification message toward the root router (operation 212). Such an encapsulation mechanism can correspond to a tunneling mechanism. Examples of a tunneling mechanism include, but are not limited to, Virtual Extensible Local Area Network (VXLAN) protocol, Generic Routing Encapsulation (GRE) protocol, Network Virtualization using GRE (NVGRE) protocol, and open-vSwitch GRE protocol.

Figure 2B:
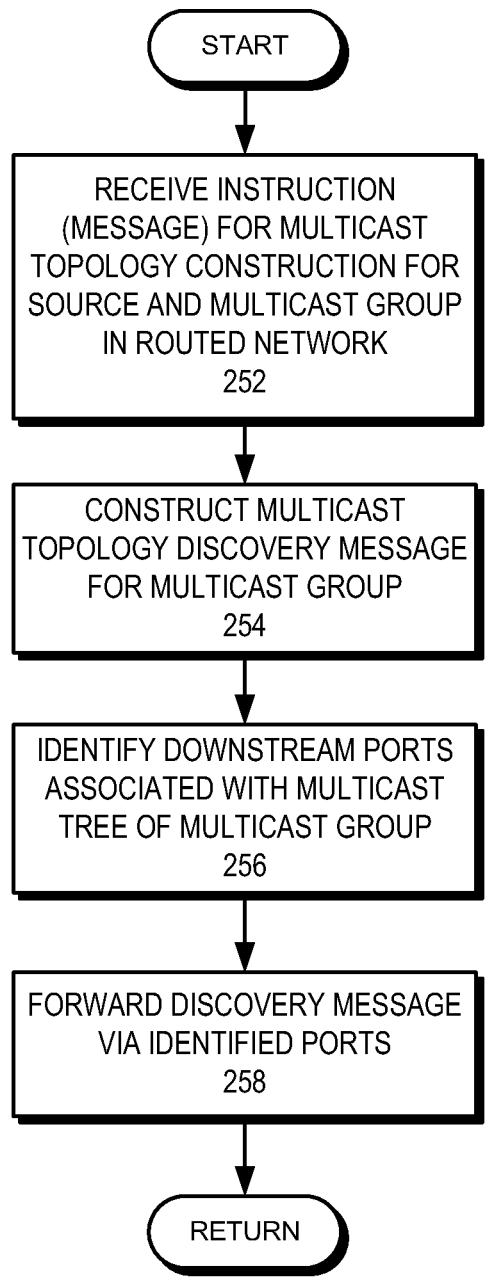
FIG. 2B presents a flowchart illustrating the process of a root router processing an instruction for constructing a multicast topology in a routed network, in accordance with an embodiment of the present invention.

FIG. 2B presents a flowchart illustrating the process of a root router processing an instruction for constructing a multicast topology in a routed network, in accordance with an embodiment of the present invention. During operation, the root router can receive an instruction, from a network administrator or from an administrator device via a notification message, to construct the multicast topology in a routed network for a source and the multicast group (operation 252). The router then constructs a multicast topology discovery message for the multicast group (operation 254). Note that the discovery message can also indicate a source of the multicast group for which the multicast topology is being constructed. In other words, the to be constructed multicast topology can be based on a shared multicast tree or a source-specific multicast tree.

In some embodiments, the discovery message can be in a PIM control message or an Mtrace discovery message format. The router identifies the downstream ports associated with the multicast tree of the multicast group (operation 256) and forwards the discovery message via the identified ports (operation 258). In some embodiments, the router identifies the downstream ports associated with the multicast group by detecting the ports associated with the downstream routers of the corresponding multicast tree. The router, for example, does not forward the multicast discovery message to the port from which it has received the instruction or to ports associated with routers not in the multicast tree.

Figure 3:
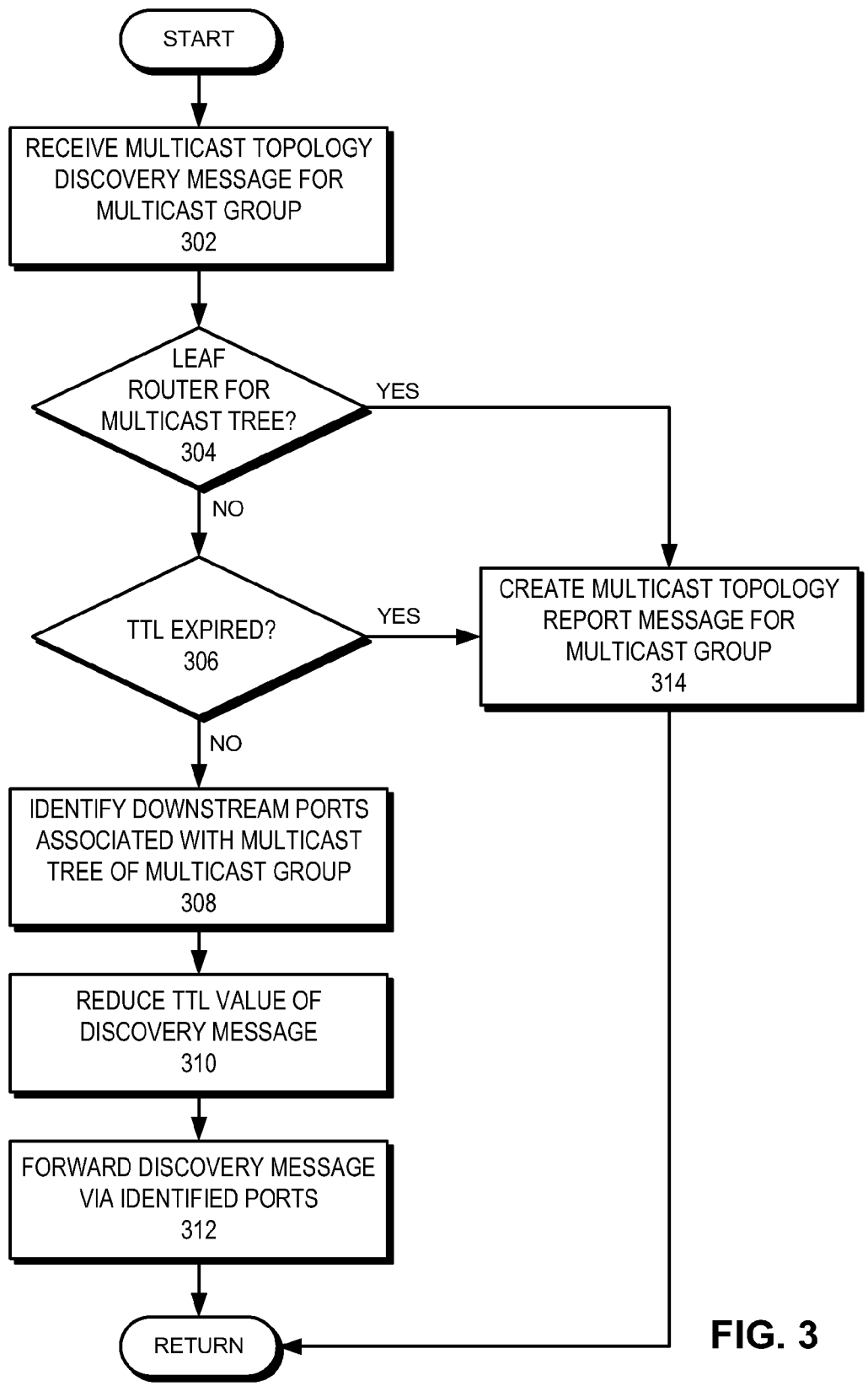
FIG. 3 presents a flowchart illustrating the process of a router processing a multicast topology discovery message for constructing a multicast topology in a routed network, in accordance with an embodiment of the present invention.

FIG. 3 presents a flowchart illustrating the process of a router processing a multicast topology discovery message for constructing a multicast topology in a routed network, in accordance with an embodiment of the present invention. During operation, the router receives a multicast topology discovery message for a multicast group (operation 302). In some embodiments, the discovery message indicates a source of the multicast group for which the multicast topology is being constructed. The router receives this discovery message from an upstream router. The router then checks whether the local router is a leaf router of the multicast tree of the multicast group (operation 304). If the local router is not a leaf router, the router checks whether the TTL of the discovery message has been expired (operation 306).

Figure 4:
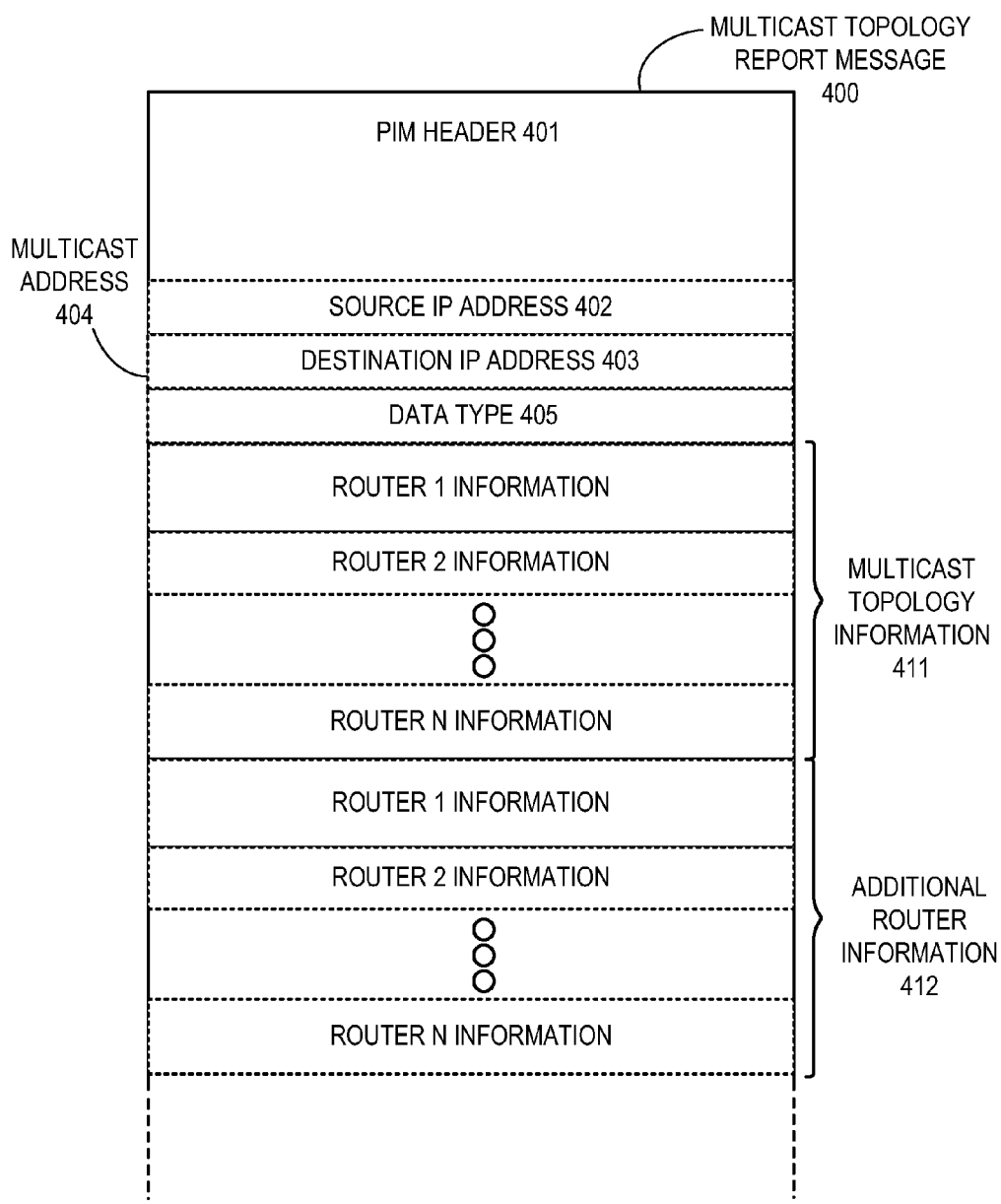
FIG. 4 illustrates an exemplary multicast topology report message, in accordance with an embodiment of the present invention.

If the local router is a leaf router (operation 304) or the TTL of the discovery message has been expired (operation 306), the router creates a multicast topology report message for the multicast group (operation 314), as described in conjunction with FIG. 1A. If the TTL has not been expired, the router identifies the downstream ports associated with the multicast tree of the multicast group (operation 308) and reduces the TTL value of the discovery message (operation 310). The router then forwards the discovery message via the identified ports (operation 312). In some embodiments, the router identifies the downstream ports associated with the multicast group by identifying the ports associated with the downstream routers of the corresponding multicast tree. Multicast Topology Report Message In the example in FIG. 1A, root router 110 sends multicast topology discovery message 142-1 and, in response, receives multicast topology report message 148 to obtain the multicast topology for the corresponding multicast group. FIG. 4 illustrates an exemplary multicast topology report message, in accordance with an embodiment of the present invention. In this example, multicast topology report message 400 comprises multicast topology information 411 from N downstream routers associated with a multicast group. Report message 400 can also include additional router information 412 for the N downstream routers.

Examples of multicast topology information 411 for a respective router include, but are not limited to, one or more identifiers of the switch in the multicast group (e.g., a media access control (MAC) address and/or an IP address), an indicator of membership in a multicast group, a port identifier which identifies the upstream port coupled to the parent switch of the switch, a list of downstream ports associated with the multicast group, and information regarding any router, which is not in the multicast tree, coupled to the router. Examples of additional router information 412 for a respective router include, but are not limited to, multicast validation information, link capacity and/or utilization of the links between routers, VLAN information, and encapsulation (e.g., tunneling) information. Note that the links between the routers can be part of one or more layer-2 networks (i.e., the routers can have one or more layer-2 networks between them).

In some embodiments, report message 400 is a PIM control message comprising a PIM header 401. Multicast group address 404 of the multicast group is assigned to destination IP address 405. The IP address of the router generating report message 400 is assigned to source IP address 404. Based on the multicast group address 404, report message 400 can travel to the routers associated with the multicast group. Data type 405 can indicate which type of PIM packet the message is. For example, data type 405 can indicate that report message 400 is a PIM Sparse Mode (SM) packet. Similarly, report message 400 can be a PIM Source-Specific Multicast (SSM) packet.

Figure 5A:
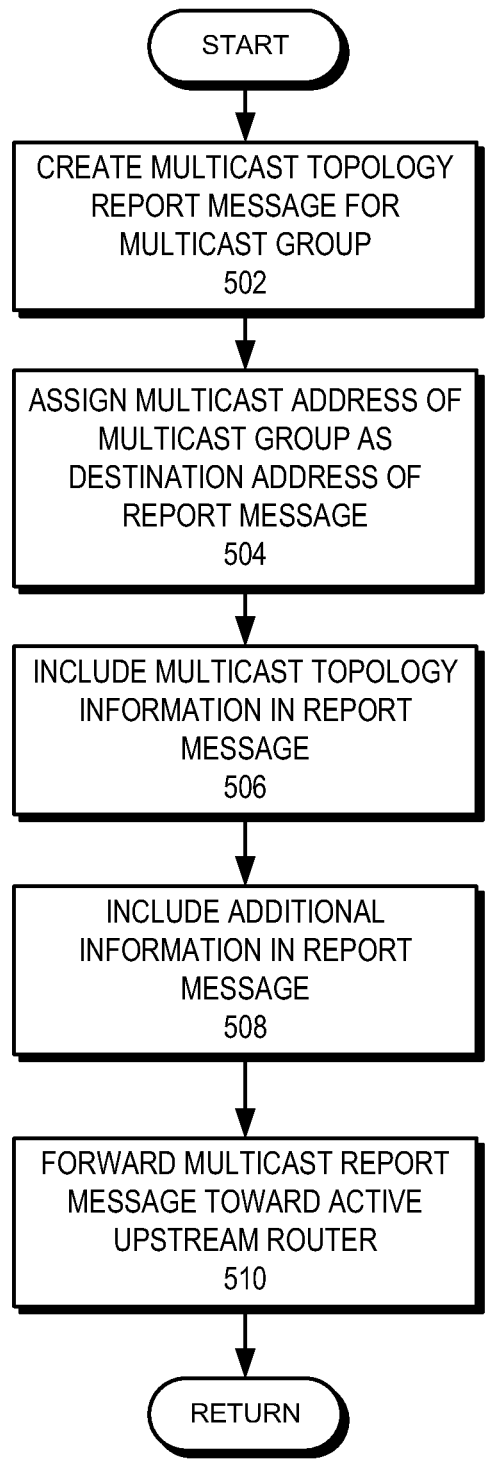
FIG. 5A presents a flowchart illustrating the process of a router issuing a multicast topology report message for constructing a multicast topology in a routed network, in accordance with an embodiment of the present invention.

FIG. 5A presents a flowchart illustrating the process of a router issuing a multicast topology report message for constructing a multicast topology in a routed network, in accordance with an embodiment of the present invention. During operation, the router receives a multicast topology discovery message for a multicast group, and either detects itself as a leaf router or detects that the TTL value of the discovery message has been expired, as described in conjunction with FIG. 3. The router creates a multicast topology report message for the multicast group (operation 502) and assigns the multicast address of the multicast group as the destination address of the report message (operation 504), as described in conjunction with FIG. 4. The router includes the multicast topology information in the report message (operation 506). In some embodiments, the router can also include additional information in the report message (operation 508). The router then forwards the report message toward the active upstream router (operation 510). This allows the report message to travel via the reverse path on which the multicast data packet travels.

Figure 5B:
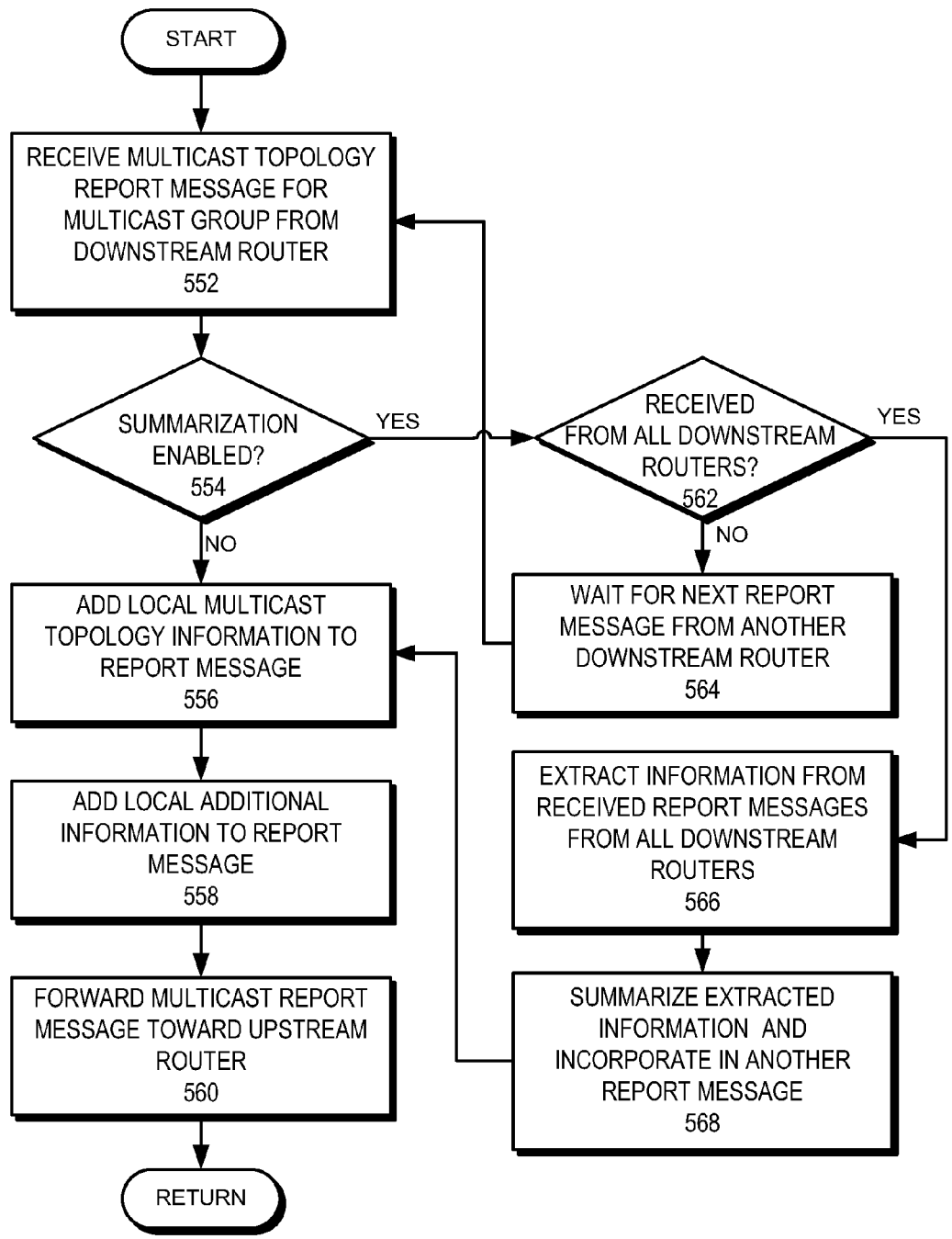
FIG. 5B presents a flowchart illustrating the process of a router processing a multicast topology report message for constructing a multicast topology in a routed network, in accordance with an embodiment of the present invention.

FIG. 5B presents a flowchart illustrating the process of a router processing a multicast topology report message for constructing a multicast topology in a routed network, in accordance with an embodiment of the present invention. Upon receiving a multicast topology report message for a multicast group from a downstream router (operation 552), the local router checks whether summarization is enabled for the router (operation 554). Summarization allows the router to wait for report messages to a respective downstream router of the corresponding multicast tree. If summarization is no enabled, the router adds local multicast topology information (operation 556) and local additional information to the received report message (operation 558), and forwards the report message toward the upstream router (operation 560). Note that although the report messages are addressed to the multicast group, the router forwards the report message only to the upstream router.

If summarization is enabled for the router (operation 554), the router checks whether the router has received report messages from all downstream routers (operation 562). If not, the router waits for the next report message from another downstream router (operation 564) and continues to receive the report messages (operation 552). If the router has received report messages from all downstream routers, the router extracts information from the received report messages from all downstream routers (operation 566) and summarizes the extracted information and incorporates the summarized information in another report message (operation 568). The router then adds local multicast topology information (operation 556) and additional information to the report message (operation 558), and forwards the report message toward the upstream router (operation 560).

Figure 5C:
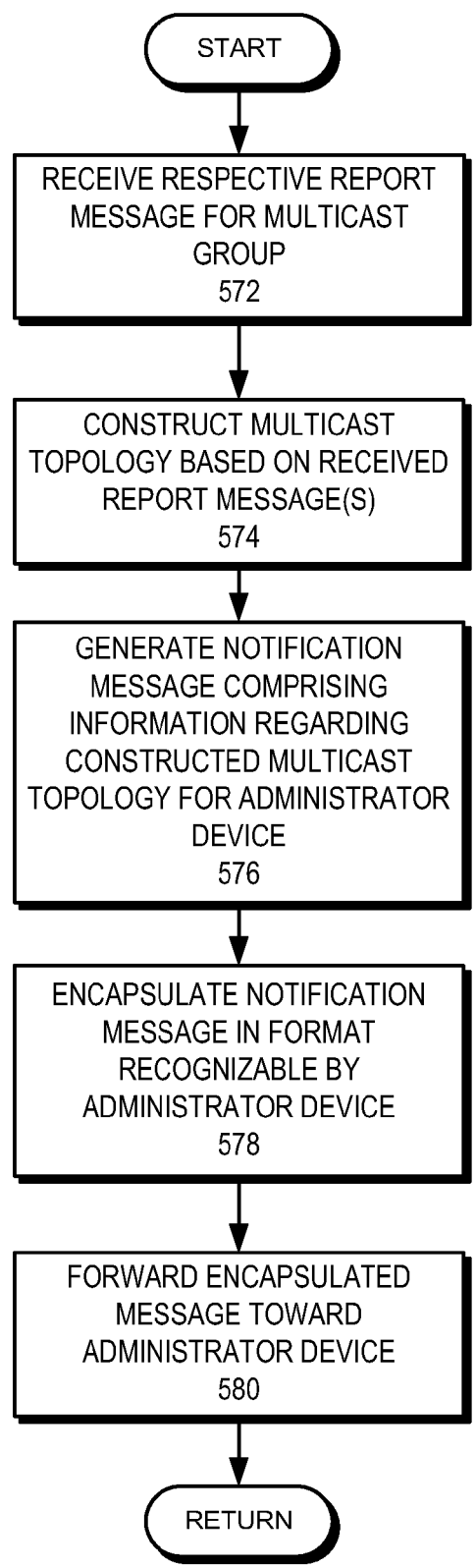
FIG. 5C presents a flowchart illustrating the process of a root router forwarding constructed multicast topology information in a routed network to an administrator device, in accordance with an embodiment of the present invention.

FIG. 5C presents a flowchart illustrating the process of a root router forwarding constructed multicast topology information in a routed network to an administrator device, in accordance with an embodiment of the present invention. During operation, upon receiving a respective report message for the multicast group (operation 572), the root router constructs the multicast topology for the multicast group (operation 574). In some embodiments, the root router stores the multicast topology information in a data structure, which can be arranged by hop-distance, indexed by the source address and the group address. Other indexing keys can include a VLAN tag and a VRF identifier. The root router then generates a notification message comprising information regarding the constructed multicast topology for the administrator device (operation 576). In some embodiments, the root router encapsulates the notification message in a format recognizable by the administrator device (operation 578) and forwards the encapsulated message to administrator device (operation 580).

Layer-2 Network

Figure 6:
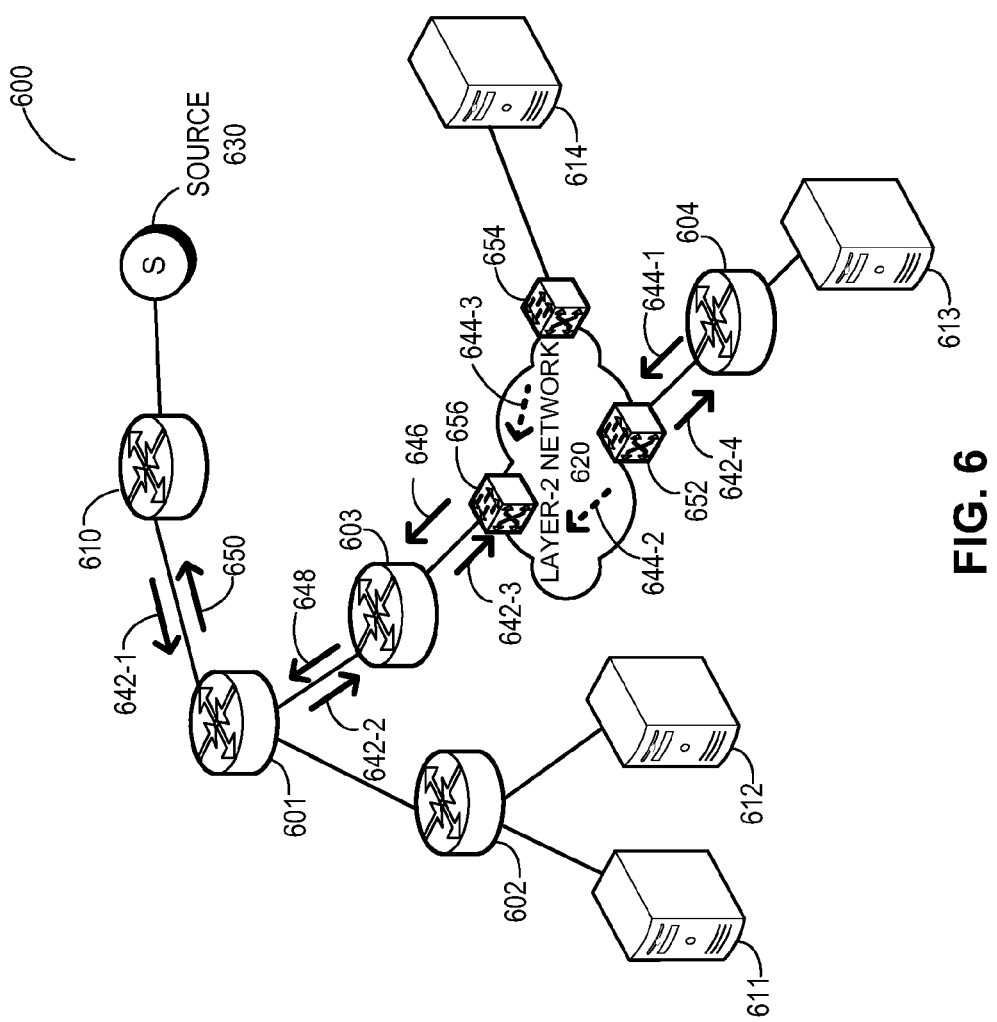
FIG. 6 illustrates an exemplary multicast topology construction in a routed network incorporating the multicast topology of a layer-2 network, in accordance with an embodiment of the present invention.

FIG. 6 illustrates an exemplary multicast topology construction in a routed network incorporating the multicast topology of a layer-2 network, in accordance with an embodiment of the present invention. A routed network 600 includes routers 601, 602, 603, and 604. Between two routers, there can be one or more wired/wireless links spanning one or more layer-2 networks (e.g., Ethernet). Examples of network 600 include, but are not limited to, an IP network and a TRILL network. In some embodiments, one or more routers in network 600 can be in a fabric switch and can appear as a single logical router (or switch) to all other routers in network 600. End devices 611 and 612 are coupled to router 602, and end device 613 is coupled to router 604. Router 610 is coupled to router 601. A source 630, which can be an end device, for a multicast group is coupled to router 610 via one or more wired and/or wireless links.

During operation, router 610 distributes periodic membership queries for the multicast group through network 600. In some embodiments, router 610 generates the membership queries. One or more of the end devices 611-613 can join the multicast group by sending a join request in response to the membership query. In some embodiments, IGMP and/or MLD can be used for the membership queries and corresponding join requests. For example, end device 613 can send an IGMP join request to router 604. Upon receiving the request, router 604 can use PIM to be a multicast router, which is a router that receives multicast traffic for the multicast group.

Router 610 directs data traffic from source 610 toward the receivers via the routers in network 600, thereby forming a multicast tree rooted at router 610 for the multicast group. As a result, router 604, as well as intermediate routers 601 and 603 join the corresponding multicast tree. Router 610 operates as the root for the multicast tree because router 610 is coupled to source 630 and first receives multicast data traffic from source 630 in network 600. In the multicast tree, router 604 is referred to as a leaf router because router 604 does not have any other downstream routers in the multicast tree.

Because end device 613 has joined the multicast group and has become a receiver of data traffic from source 630, the corresponding multicast topology includes a forwarding data path from router 610 to router 604, which is coupled to end device 613. This forwarding path includes intermediate routers 601 and 603. In this example, routers 603 and 604 are coupled to each other via layer-2 network 620, which supports multicast topology construction. Layer-2 network 620 can refer to any network which includes networking layers lower than layer-3. Examples of a layer-2 network include, but are not limited to, an Ethernet network, a TRILL network, or a combination of networking layers. Network 620 includes switches 652, 654, and 656, each of which is capable of recognizing and processing discovery and report messages.

To facilitate intelligent forwarding of multicast packets in network 620, a respective switch in network 620 forwards multicast packets only to those ports of the switch that are connected to a neighboring device associated with the multicast group. In some embodiments, a respective switch in network 620 is capable of PIM packet snooping. For example, based on PIM snooping, switch 656 is aware of switch 652 being coupled to router 604, which is associated with the multicast group. Intelligent forwarding of multicast packets based on PIM snooping is specified in U.S. Pat. No. 8,443,103, titled "Method and system for intelligently forwarding multicast packets," by inventors Nitin Jain, Lee Chen, Earl Ferguson, and Min Zhu, the disclosure of which is incorporated herein in its entirety.

Upon receiving an instruction for constructing a multicast topology, root router 610 sends a multicast topology discovery message 642-1 to router 601. For further forwarding of discovery message 642-1, router 601 identifies router 603 as the downstream router in the multicast tree and forwards discovery message 642-2 toward router 603. Router 603 receives discovery message 642-2, identifies router 604 as the downstream router in the multicast tree, and forwards discovery message 642-3 toward router 604 via switch 656 in layer-2 network 620. Upon receiving discovery message 642-3, switch 656 recognizes the message to be a discovery message and forwards discovery message 642-3 to a respective switch in network 620. Consequently, switches 652 and 654 receive discovery message 642-3 from switch 656 via one or more links. In some embodiments, switch 652 is aware of router 604 as a router belonging to the multicast group based on PIM snooping. Switch 652 then forwards discovery message 642-4 to router 604. Note that discovery messages 642-1, 642-2, 642-3, and 642-4 are copies of the same discovery message and can generally be referred to as discovery message 642.

Router 604 receives discovery message 642-4, identifies itself as a leaf router, constructs a multicast topology report message 644-1, and includes multicast topology information and additional information in report message 644-1. Router 604 then forwards report message 644-1 toward router 603 by sending report message 644-1 to the multicast address of the multicast group. Message 644-1 follows the reverse forwarding path of the multicast tree and reaches the next active upstream router of the multicast tree, router 603.

However, because router 603 and 604 have network 620 between them and network 620 supports layer-2 topology construction, while message 644-1 travels toward router 603, switch 652 receives message 644-1. Switch 652 extracts the local multicast topology information (and additional information) for the multicast group and includes the extracted information in report message 644-2. Note that message 644-2 only travels within layer-2 network 620 (denoted with dotted line). This local information can be VLAN-specific. For example, the discovery message can specify a VLAN, or switch 652 can determine the VLAN association based on the VLAN configuration of its local ports. Furthermore, switch 652 is also aware of switch 656 to be the next active upstream switch in the reverse forwarding path of the multicast tree. In some embodiments, the local information regarding the multicast group and/or the forwarding path information is obtained based on PIM snooping. Switch 652 then forwards report message 644-2 toward switch 656. Because switch 652 is aware of switch 656 to be the next active upstream switch in the reverse forwarding path of the multicast tree, switch 652 does not forward report message 644-2 toward switch 654.

Note that router 603 can receive a plurality of such report messages from network 620 even though router 603 has only one downstream router 604 in this example. Suppose that an end device 614 is coupled to network 620 via switch 654 and is a receiver of multicast data of the multicast group. If switch 654 does not have any other downstream switch in the multicast tree in network 620, switch 654 is a leaf switch. Switch 654 then extracts the local multicast topology information (and additional information) for the multicast group, includes the extracted information in report message 644-3 (denoted with dotted line), and forwards report message 644-3 toward switch 656. In some embodiments, switch 654 is aware of switch 656 to be the next active upstream switch in the reverse forwarding path of the multicast tree. Because this awareness, switch 654 forwards report message 644-3 only toward switch 656, and not toward switch 652. Report messages 644-2 and 644-3 travel, hop-by-hop, through the multicast tree of network 620 and incorporates information regarding a respective switch on these report messages' path toward switch 656.

Upon receiving report messages 644-2 and 644-3, switch 656 can include local multicast topology information (and additional information) in a respective report message and forward toward router 603. Switch 656 also can wait for a period of time for receiving both report messages 644-2 and 644-3. Switch 656 then summarizes the multicast topology information (and additional information) from report messages 644-2 and 644-3, creates report message 646 comprising the summary and local multicast topology information (and additional information), and forward report message 646 toward router 603. In this way, switches in layer-2 network facilitate multicast topology construction in a layer-2 network in conjunction with multicast topology construction in a routed network. Multicast topology construction in a layer-2 network is specified in U.S. patent application Ser. No. 13/928,019, titled "Efficient Layer-2 Multicast Topology Construction," by inventors Nitin Jain and Aseem. S. Rastogi, filed 26 Apr. 2013, the disclosure of which is incorporated herein in its entirety.

Upon receiving report message 646, or report messages 644-2 and 644-3 from switch 656, router 603 processes the corresponding report message(s). Switch 603 constructs a report message 648, includes the information from the received report message(s) in report message 648, and adds local multicast topology and additional information to report message 648. Note that router 603 incorporates the layer-2 multicast topology information and additional information obtained from report messages 644-2 and 644-3, and/or report message 646 in report message 648. Router 603 then forwards report message 648 toward router 601 by sending report message 648 to the multicast address of the multicast group. There can be another layer-2 network between router 601 and 603. However, if that layer-2 network does not support multicast topology construction, report message 648 is forwarded via that layer-2 network simply as another message without constructing a multicast topology for that layer-2 network.

Router 601 receives and processes report message 646, constructs a report message 650, includes the information from report message 648 in report message 650, and adds local multicast topology and additional information to report message 650. Router 601 then forwards report message 650 toward router 610 by sending report message 650 to the multicast address of the multicast group. Root router 610 receives report message 650, extracts information from report message 650, and constructs the multicast topology for the multicast group based on the extracted information. Because the discovery and report messages (e.g., messages 642, 644, 646, 648, and 650) traverse the reverse forwarding path of the multicast tree in network 600, the constructed multicast topology accurately represents paths to all leaf routers in the multicast distribution tree. Furthermore, because the layer-2 report messages (e.g., messages 644-2 and 644-2, and/or report message 646) traverse the multicast tree in network 620, the constructed multicast topology accurately represents the intermediate layer-2 multicast topologies as well. In this way, one single instruction can construct the multicast topology for the multicast group both in a routed network and any layer-2 network between the routers of the routed network.

Figure 7A:
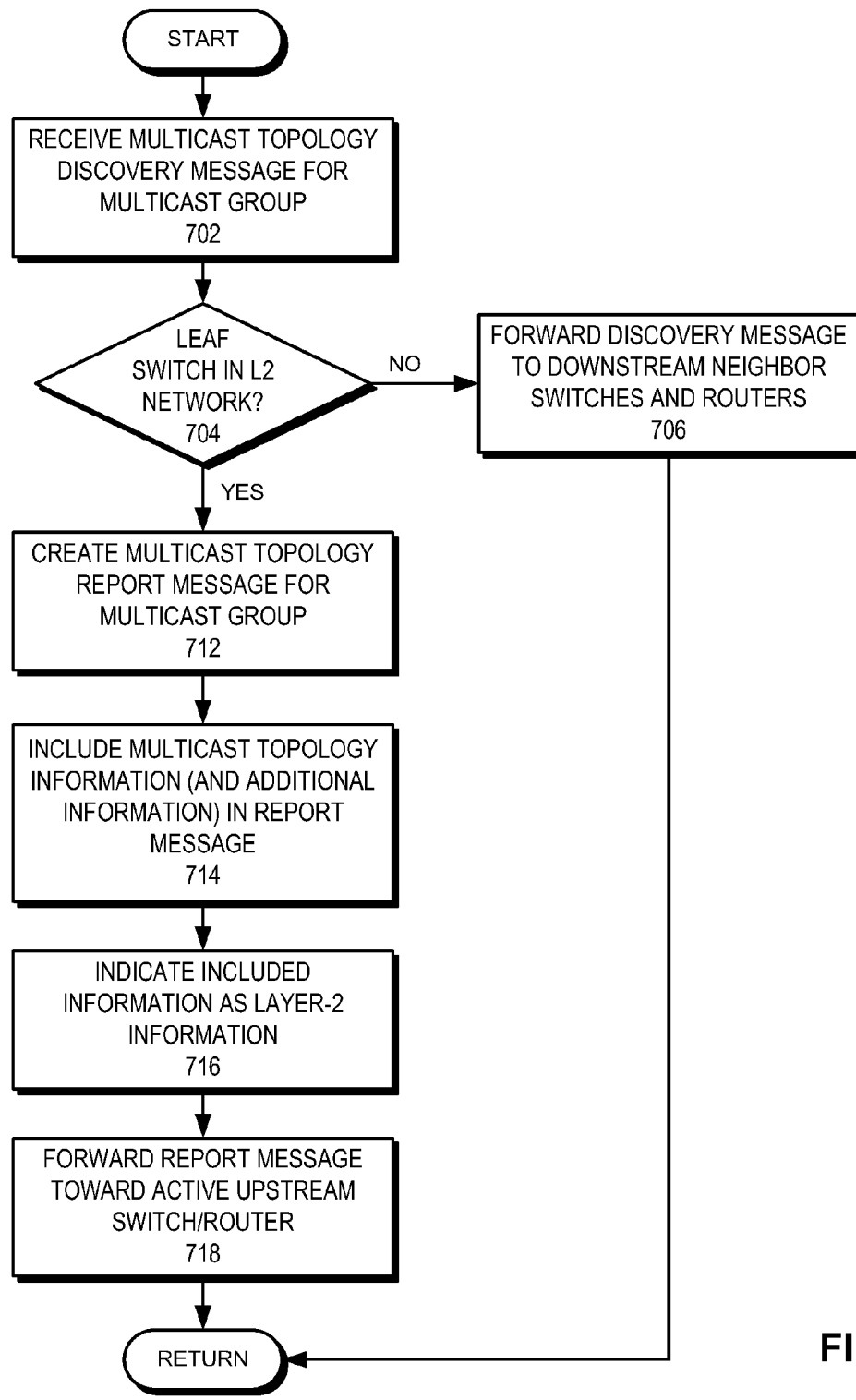
FIG. 7A presents a flowchart illustrating the process of a switch in a layer-2 network processing a multicast topology discovery message for incorporating a multicast topology in a routed network, in accordance with an embodiment of the present invention.

FIG. 7A presents a flowchart illustrating the process of a switch in a layer-2 network processing a multicast topology discovery message for incorporating a multicast topology in a routed network, in accordance with an embodiment of the present invention. During operation, the switch receives a multicast topology discovery message for a multicast group (operation 702). The switch then checks whether the switch is a leaf switch (operation 704). If the switch is not a leaf switch, the switch forwards the discovery message to downstream neighbor switches and routers (operation 706). Otherwise, the switch creates a multicast report message for the multicast group (operation 712). The switch includes multicast topology information (and, in come embodiments, additional information) in the report message (operation 714), indicates the included information as layer-2 information (operation 716), and forwards the report message toward the active upstream switch/router (operation 718). In some embodiments, the switch is aware of the next active upstream switch/router in the reverse forwarding path of the multicast tree of the multicast group based in PIM snooping.

Figure 7B:
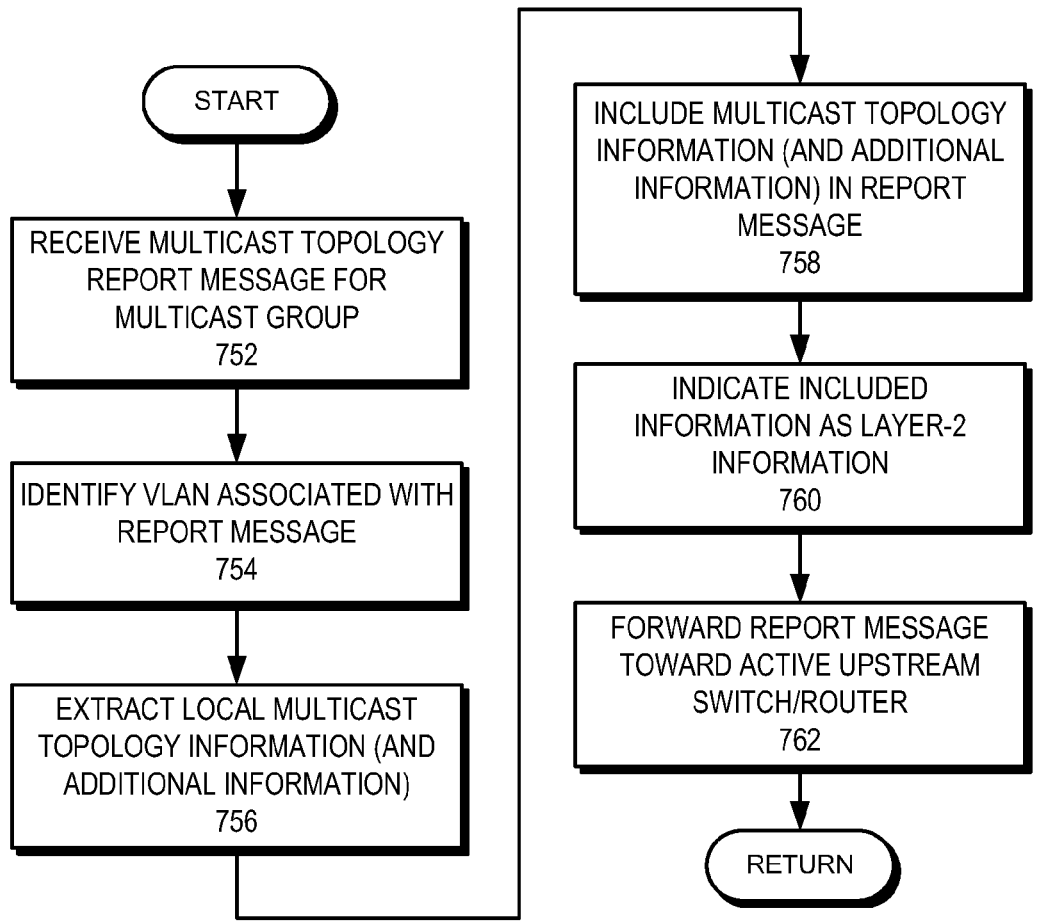
FIG. 7B presents a flowchart illustrating the process of a switch in a layer-2 network processing a multicast topology report message for incorporating a multicast topology in a routed network, in accordance with an embodiment of the present invention.

FIG. 7B presents a flowchart illustrating the process of a switch in a layer-2 network processing a multicast topology report message for incorporating a multicast topology in a routed network, in accordance with an embodiment of the present invention. Upon receiving a multicast topology report message from for a multicast group (operation 752), the switch identifies the VLAN associated with the report message (operation 754). For example, the report message and/or the corresponding discovery message can specify a VLAN, or the switch can determine the VLAN based on the VLAN configuration of its local ports.

The switch then extracts local multicast topology information (operation 756). In some embodiments, the switch extracts additional information from the received messages as well. The switch includes multicast topology information (and, in come embodiments, additional information) in the report message (operation 758) and indicates the included information as layer-2 information (operation 760). The switch then forwards the report message toward the active upstream switch/router (operation 762), as described in conjunction with FIG. 6. In some embodiments, the switch is aware of the next active upstream switch/router in the reverse forwarding path of the multicast tree of the multicast group based in PIM snooping.

Exemplary Router

Figure 8:
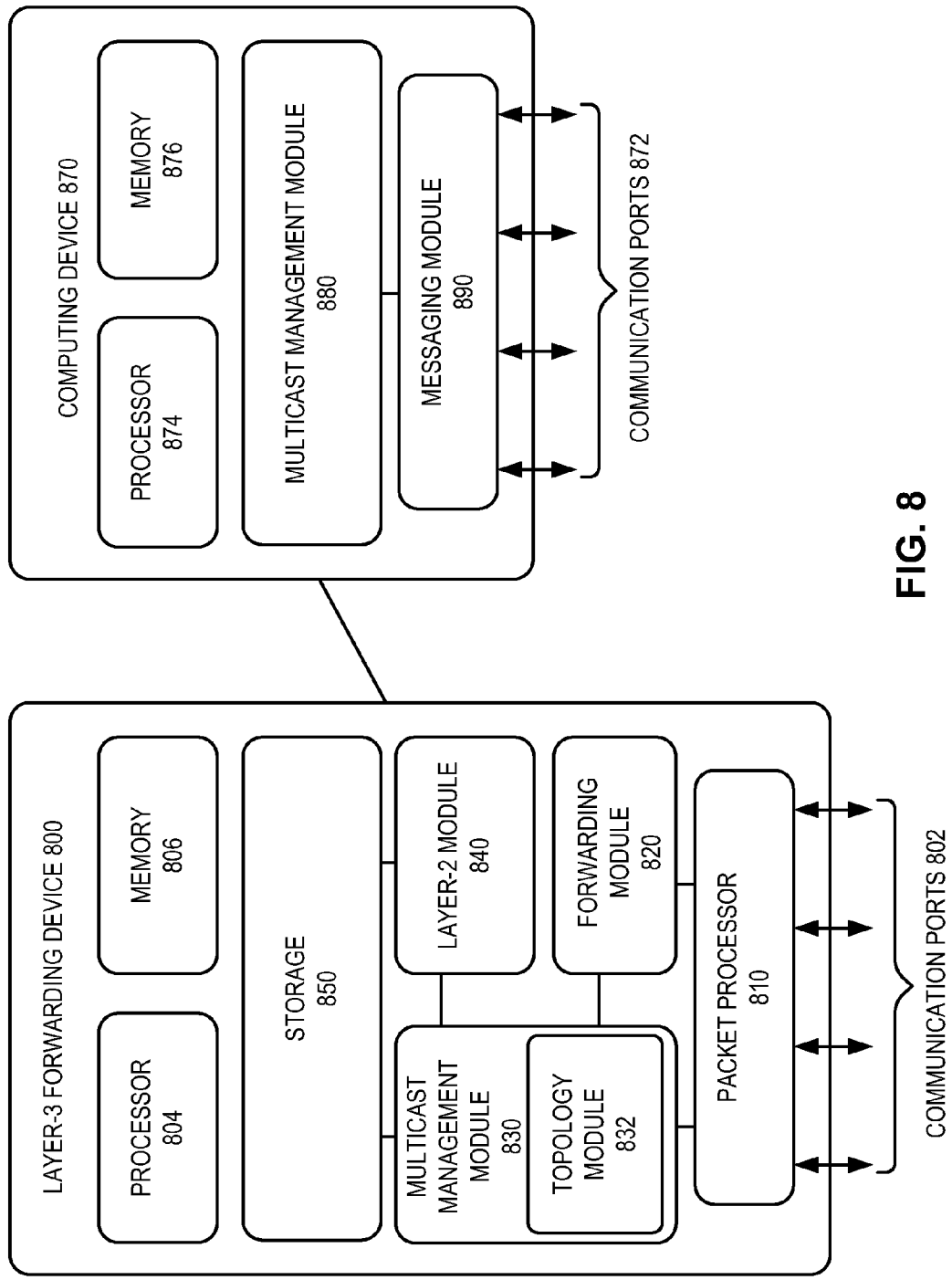
FIG. 8 illustrates exemplary devices supporting efficient multicast topology construction, in accordance with an embodiment of the present invention.

FIG. 8 illustrates exemplary devices supporting efficient multicast topology construction, in accordance with an embodiment of the present invention. In this example, a layer-3 forwarding device 800 includes a general purpose processor 804, a memory 806, a number of communication ports 802, a packet processor 810, a multicast management module 830, a topology module 832, a layer-2 module 840, a forwarding module 820, and a storage device 850. Examples of a layer-3 forwarding device 800 include, but are not limited to, a router, a switch, and an RBridge. Processor 804 executes instructions stored in memory 806 to facilitate multicast topology construction for a multicast group by layer-3 forwarding device 800 in a routed network.

During operation, layer-3 forwarding device 800 receives a multicast discovery message via one of the communication ports 802. In response, multicast management module 830 determines whether layer-3 forwarding device 800 is a leaf router of a multicast distribution tree of a multicast group. If layer-3 forwarding device 800 is a leaf router, topology module 832 constructs a multicast topology report message comprising topology information of the multicast group associated with layer-3 forwarding device 800. Topology module 832 can also include additional information in the multicast topology report message. Forwarding module 820 forwards the report message based on a multicast address of the multicast group. In some embodiments, topology module 832 can enable an alert option for the report message.

In some embodiments, the multicast topology discovery message also includes a TTL value. This TTL value indicates number of hops multicast topology discovery message is allowed to travel via the routed network associated with layer-3 forwarding device 800. Multicast management module 830 determines whether the TTL has been expired. If multicast management module 830 determines that the TTL value is expired, topology module 832 constructs the multicast topology report message. In some embodiments, layer-3 forwarding device 800 also includes a layer-2 module 840 which detects a layer-2 network.

This layer-2 network is coupled to layer-3 forwarding device 800 and with multicast topology construction support. In response, layer-2 module 840 obtains topology information of the multicast group in the layer-2 network, as described in conjunction with FIG. 6. Topology module 832 then includes the topology information of the multicast group in the layer-2 network in the multicast topology report message.

If multicast management module 830 determines that layer-3 forwarding device 800 is not a leaf router, packet processor 810 extracts the topology information of the multicast group from a multicast topology report message received via one of the communication ports 802. Topology module 832 adds topology information of the multicast group associated with layer-3 forwarding device 800 in the report message. Forwarding module 820 then forwards the report message to the upstream router. Multicast management module 830 precludes forwarding module 820 from forwarding the report message to downstream routers of the multicast distribution tree.

In some embodiments, packet processor 810 extracts topology information of the multicast group from a plurality of multicast topology report messages, which correspond to a plurality of downstream routers with respect to layer-3 forwarding device 800 and are received via a plurality of the communication ports 802. Topology module 832 constructs a new report message, summarizes the extracted topology information, and includes the summarized information in the report message. Topology module 832 then includes topology and additional information associated with layer-3 forwarding device 800 in the new report message. Forwarding module 820 forwards the new report message to the upstream router.

In some embodiments, the routed network includes a computing device 870, which can be coupled to layer-3 forwarding device 800 via one or more physical/wireless links. Computing device 870 can be an administrator device, as described in conjunction with FIG. 1A. Computing device 870 includes a general purpose processor 874, a memory 876, a number of communication ports 872, a messaging module 890, and a multicast management module 880. Processor 804 executes instructions stored in memory 806 to provide instructions to the root router of the multicast distribution tree for constructing a multicast topology for the multicast group in the routed network.

During operation, multicast management module 880 generates an instruction, which can be in a TLV format, for constructing the multicast topology. This instruction includes an identifier of the multicast group and an identifier of a source of the multicast group. The instruction can also include a TTL value, which indicates number of hops a multicast topology discovery message is allowed to travel in the routed network. Messaging module 890 incorporates the instruction in a message and sends the message to the root router of the multicast distribution tree via one of the communications ports 872. This message can be encapsulated in a format recognizable by the root switch.

Note that the above-mentioned modules can be implemented in hardware as well as in software. In one embodiment, these modules can be embodied in computer-executable instructions stored in a memory which is coupled to one or more processors in layer-3 forwarding device 800 and computing device 870. When executed, these instructions cause the processor(s) to perform the aforementioned functions.

In summary, embodiments of the present invention provide a switch and a method for constructing a multicast topology in a routed network. In one embodiment, the switch includes a processor and a computer-readable storage medium. The computer-readable storage medium stores instructions which when executed by the processor cause the processor to perform a method. The method comprises determining whether the switch is a leaf switch of a multicast distribution tree of a multicast group in a routed network based on a multicast topology discovery message from a root switch of the multicast distribution tree. If the switch is the leaf switch, the method comprises constructing a multicast topology report message. This multicast topology report message includes topology information of the multicast group in the routed network associated with the switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A layer-3 forwarding device, comprising:
   a processor; and
   a non-transitory computer-readable storage medium storing instructions which when executed by the processor cause the processor to perform a method, the method comprising:
   identifying a multicast topology discovery message destined to a multicast group associated with a multicast distribution tree in a routed network, wherein the layer-3 forwarding device is a member of the multicast group;

determining, locally, whether the layer-3 forwarding device is a leaf node of the multicast distribution based on the multicast topology discovery message; and in response to determining that the layer-3 forwarding device is a leaf node of the multicast distribution tree, constructing a first multicast topology report message, which is a multicast message destined to the multicast group and comprises topology information of the multicast group associated with the layer-3 forwarding device.

2. The layer-3 forwarding device of claim 1, wherein the method further comprises, in response to determining that the layer-3 forwarding device is a leaf node of the multicast distribution tree, including additional information in the first multicast topology report message, wherein the additional information corresponds to device and link information associated with the layer-3 forwarding device.

3. The layer-3 forwarding device of claim 1, wherein the method further comprises determining one or more egress ports for the first multicast topology report message, wherein the determined egress ports correspond to upstream layer-3 forwarding devices of the multicast group.

4. The layer-3 forwarding device of claim 1, wherein the method further comprises, in response to determining that the layer-3 forwarding device is not a leaf node of the multicast distribution tree, extracting topology information of the multicast group from a second multicast topology report message.

5. The layer-3 forwarding device of claim 4, wherein the method further comprises including topology information of the multicast group associated with the layer-3 forwarding device in the second multicast topology report message.

6. The layer-3 forwarding device of claim 4, wherein the method further comprises extracting topology information of the multicast group from a third multicast topology report message; and wherein the topology information extracted from the second and third multicast topology report messages correspond to a plurality of downstream layer-3 forwarding devices in the multicast distribution tree with respect to the switch.

7. The layer-3 forwarding device of claim 6, wherein the method further comprises:

summarizing the extracted topology information corresponding to the plurality of downstream layer-3 forwarding devices;

including the summarized information in a fourth multicast topology report message; and including topology information of the multicast group associated with the layer-3 forwarding device in the fourth multicast topology report message.

8. The layer-3 forwarding device of claim 7, wherein the method further comprises precluding the layer-3 forwarding device from associating a local port with the fourth multicast topology report message as an output port, wherein the local port is an egress port for a downstream layer-3 forwarding device of the multicast distribution tree.

9. The layer-3 forwarding device of claim 1, wherein the multicast topology discovery message further comprises a time to leave (TTL) value, wherein the TTL value indicates a number of hops multicast topology discovery message is allowed to travel in a routed network.

10. The layer-3 forwarding device of claim 9, wherein the method further comprises, in response to determining the TTL value to be expired, constructing the first multicast topology report message.

11. The layer-3 forwarding device of claim 9, wherein the first multicast topology report message further comprises topology information of the multicast group in a layer-2 network associated with the layer-3 forwarding device.

12. A computing system, comprising:
a processor; and
a non-transitory computer-readable storage medium storing instructions which when executed by the processor cause the processor to perform a method, the method comprising:

generating an instruction for constructing a multicast topology for a multicast group in a routed network, wherein the instruction comprises an identifier of the multicast group and an identifier of a source of the multicast group, and wherein identifying information for a leaf node is not included in the instruction; and incorporating the instruction in a notification message;

assigning an Internet Protocol (IP) address of a root node of a multicast distribution -tree of the multicast group as a destination address of the notification message, and wherein the root node of the multicast distribution tree is reachable to the source of the multicast group via one or more links.

13. The computing system of claim 12, wherein the instruction is in a type-length-value (TLV) format.

14. The computing system of claim 12, wherein the notification message is encapsulated with an encapsulation header recognizable by the root node of the multicast distribution tree .

15. The computing system of claim 12, wherein the instruction further comprises a time to leave (TTL) value, wherein the TTL value indicates a number of hops a multicast topology discovery message is allowed to travel in a routed network.

16. A method, comprising:
identifying, by a computer, a multicast topology discovery message destined to a multicast group associated with a multicast distribution tree in a routed network, wherein a layer-3 forwarding device is a member of the multicast group;

determining, whether the layer-3 forwarding device is a leaf node of the multicast distribution tree based on the multicast topology discovery message; and in response to determining that the layer-3 forwarding device is the leaf node of the multicast distribution tree, constructing a first multicast topology report message, which is a multicast message destined to the multicast group and comprises topology information of the multicast group associated with the layer-3 forwarding device.

17. The method of claim 16, further comprising, in response to determining that the layer-3 forwarding device is a leaf node of the multicast distribution tree, including additional information in the first multicast topology report message, wherein the additional information corresponds to device and link information associated with the layer-3 forwarding device.

18. The method of claim 16, further comprising determining one or more egress ports for the first multicast topology report message, wherein the determined egress ports correspond to upstream layer-3 forwarding devices of the multicast group.

19. The method of claim 16, further comprising, in response to determining that the layer-3 forwarding device is not a leaf node of the multicast distribution tree, extracting topology information of the multicast group from a second multicast topology report message.

20. The method of claim 19, further comprising including topology information of the multicast group associated with the layer-3 forwarding device in the second multicast topology report message.

21. The method of claim 19, further comprising extracting topology information of the multicast group from a third multicast topology report message; and
   wherein the topology information extracted from the second and third multicast topology report messages correspond to a plurality of downstream layer-3 forwarding devices in the multicast distribution tree with respect to the switch.

22. The method of claim 21, further comprising:
   summarizing the extracted topology information corresponding to the plurality of downstream layer-3 forwarding devices;
   including the summarized information in a fourth multicast topology report message; and
   including topology information of the multicast group associated with the layer-3 forwarding device in the fourth multicast topology report message.

23. The method of claim 22, further comprising precluding the layer-3 forwarding device from associating a local port with the fourth multicast topology report message as an output port, wherein the local port is an egress port for a downstream layer-3 forwarding device of the multicast distribution tree.

24. The method of claim 16, wherein the multicast topology discovery message further comprises a time to leave (TTL) value, wherein the TTL value indicates a number of hops multicast topology discovery message is allowed to travel in a routed network.

25. The method of claim 24, further comprising, in response to determining the TTL value to be expired, constructing the first multicast topology report message.

26. The method of claim 24, wherein the first multicast topology report message further comprises topology information of the multicast group in a layer-2 network associated with the layer-3 forwarding device.

* * * * *